US007720457B2

(12) United States Patent
Lucinian

(10) Patent No.: US 7,720,457 B2
(45) Date of Patent: May 18, 2010

(54) METHOD AND APPARATUS FOR MINIMIZING NOISE ON A POWER SUPPLY LINE OF A MOBILE RADIO

(75) Inventor: Penelope Anne Lucinian, Weston, FL (US)

(73) Assignee: Motorola, Inc., Schaumburg, IL (US)

( * ) Notice: Subject to any disclaimer, the term of this patent is extended or adjusted under 35 U.S.C. 154(b) by 724 days.

(21) Appl. No.: 11/551,132

(22) Filed: Oct. 19, 2006

(65) Prior Publication Data

US 2008/0096511 A1 Apr. 24, 2008

(51) Int. Cl.
*H04B 1/10* (2006.01)

(52) U.S. Cl. .................... 455/296; 455/307; 455/67.11

(58) Field of Classification Search ................ 455/296, 455/307, 226.1–226.4, 67.11–67.13; 363/45, 363/46, 47, 48, 49, 53, 125
See application file for complete search history.

(56) References Cited

U.S. PATENT DOCUMENTS 4,027,107 A 5/1977 Eilers
5,043,686 A 8/1991 Plunkett
5,526,328 A * 6/1996 Oshima et al. .......... 369/13.02
5,668,708 A * 9/1997 Scapellati .................. 363/46
5,694,302 A * 12/1997 Faulk ......................... 363/16
5,890,059 A * 3/1999 Shoemaker et al. ........ 455/297
5,917,921 A 6/1999 Sasaki et al.
5,995,567 A 11/1999 Cioff et al.
6,700,801 B2 * 3/2004 Morita et al. ............... 363/47
6,853,158 B2 2/2005 Tan et al.
6,961,255 B2 * 11/2005 Nagai et al. ................. 363/97
6,968,171 B2 * 11/2005 Vanderhelm et al. ....... 455/296
7,200,015 B1 * 4/2007 Mirskiy ...................... 363/47
7,289,582 B2 * 10/2007 Jang et al. .................. 455/296
7,457,604 B2 * 11/2008 Patel ......................... 455/296
2002/0075699 A1 * 6/2002 Hsu ...................... 363/21.16

(Continued)

FOREIGN PATENT DOCUMENTS

WO 2008051664 A2 5/2008

(Continued)

OTHER PUBLICATIONS

PCT International Preliminary Report Application No. PCT/US2007/078718 dated Apr. 30. 2009—8 Pages.

(Continued)

*Primary Examiner*—Lana N Le
(74) *Attorney, Agent, or Firm*—Barbara R. Doutre

(57) ABSTRACT

An apparatus and method are provided for minimizing noise on a power supply line (105) of a mobile radio, such as generated in a vehicular environment. An adaptive power supply conditioner (100) detects unwanted noise on the vehicle's power supply line (105) and via the use of an adaptive noise canceller (140), generates a cancellation signal (145) having the same amplitude but opposite phase of the input signal's detected noise. The cancellation signal (145) is fed forward and combined with the power supply line (105) in order to minimize unwanted noise on the supply line (105) leading to the mobile radio. The conditioner's output (165) is checked for further error and is fed back to the adaptive noise filter (140) for further filtering and the generation of an updated cancellation signal based on current noise conditions.

21 Claims, 6 Drawing Sheets

365
360
305
1
2
302
POWER SUPPLY INTERFACE DEVICE
310 SIGNAL CONDITIONER
345
370 DC BLOCK FILTER
315
340
375
1
2
ADAPTIVE NOISE CANCELLER
300

U.S. PATENT DOCUMENTS

| | | | | |
|---|---|---|---|---|
| 2005/0003778 | A1 * | 1/2005 | Ainsworth | 455/307 |
| 2005/0017703 | A1 | 1/2005 | Walters et al. | |
| 2005/0018457 | A1 * | 1/2005 | Iwashita | 363/95 |
| 2005/0025088 | A1 | 2/2005 | Choi | |
| 2005/0067363 | A1 | 3/2005 | Noma et al. | |
| 2005/0073865 | A1 | 4/2005 | Steigerwald et al. | |
| 2005/0099967 | A1 | 5/2005 | Baba | |
| 2005/0110474 | A1 | 5/2005 | Ortiz et al. | |
| 2005/0111243 | A1 | 5/2005 | Tzeng et al. | |
| 2005/0113055 | A1 | 5/2005 | Nakagaki | |

FOREIGN PATENT DOCUMENTS

| | | |
|---|---|---|
| WO | 2008051664 A3 | 5/2008 |

OTHER PUBLICATIONS

PCT International Preliminary Report Applicaiton No. PCT/US2007/078718 dated Apr. 17, 2008—8 Pages.

* cited by examiner

METHOD AND APPARATUS FOR MINIMIZING NOISE ON A POWER SUPPLY LINE OF A MOBILE RADIO

FIELD OF THE INVENTION

The present invention generally relates to mobile radios and more particularly to the minimization of power supply ripple or noise found on raw DC input supply line to the mobile radio mounted in motor vehicles.

BACKGROUND

Mobile radios mounted in cars, motorcycles, trucks or other vehicles are powered by the vehicle's main power supply. A main power supply line is run throughout the vehicle to power electromechanical components in addition to the mobile radio. The main power supply line is often subjected to unwanted noise, commonly referred to as power supply ripple or alternator whine. The intensity of alternator induced radio noise increases and decreases with changes in engine speed. The noise may also be caused by the noisy electrical and thermal environment in the vehicle.

Conventional approaches to addressing unwanted noise on the supply line include the use of ripple regulators. These ripple regulators utilize capacitors, inductors and transistors for forming passive filters that block the ripple noise on the supply line. However, the low-frequency filter bandwidth required for these filters can only be realized by the use of large capacitors and inductors. This makes these approaches undesirable for applications where size and/or weight are important factors. Furthermore, the parasitic capacitance and inductance of transistors leads to timing delays in the components of the regulator. As a result, the output of the regulator may overshoot or undershoot the desired output. Heating of capacitors and inductors is another cause of concern in such regulators.

Other approaches to overcome the power supply noise problem have required significant hardware additions that draw additional current and may result in a voltage drop on the power supply line. Feedback control techniques that have been used in the past tend to introduce the potential for instability and oscillation, thereby putting more noise on the power supply line.

Accordingly, it would be desirable to have an improved method and apparatus to address unwanted noise on the power supply line, particularly as applied to powering a mobile radio in a vehicular environment. It would be further desirable to have an improved method and apparatus with reduced power requirement.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
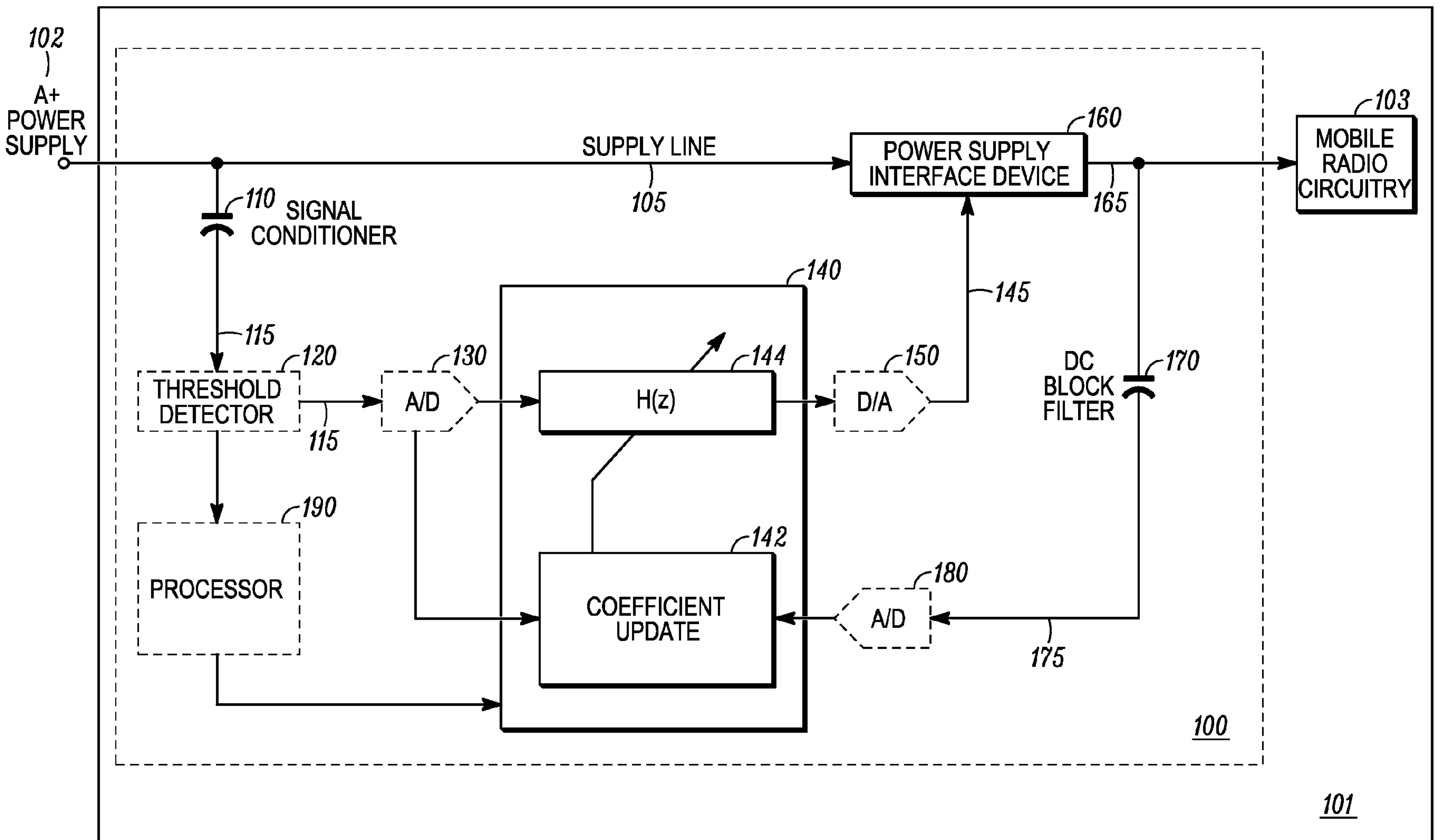
FIG. 1 is a block diagram of a power supply conditioner for a mobile radio formed accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in an apparatus and method for cancelling noise on a power supply line leading to a mobile radio mounted in a vehicle. The power supply conditioner of the present invention provides improved noise reduction via the use of adaptive filtering. Accordingly, the apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

FIG. 1 is a block diagram of a power supply conditioner 100 for a mobile radio 101 in accordance with an embodiment of the invention. Power supply conditioner 100 is preferably incorporated within the mobile radio 101. A main power supply (A+) 102, typically the vehicle battery, powers a plurality of electromechanical components within the vehicle including mobile radio 101. Mobile radio 101 receives power from the main power supply 102 via a power supply line 105, which as discussed previously, can be subjected to unwanted noise generated thereon from other electromechanical components. In accordance with the present invention, power supply conditioner 100 is incorporated within mobile radio 101 to extract the unwanted noise and provide feed-forward rejection via the use of an adaptive noise canceller 140 to continuously minimize noise on power supply line 105.

In accordance with the embodiment of FIG. 1, power supply conditioner 100 includes a first DC block 110, shown as a capacitor, coming off of main power supply line 105 and leading to a threshold detector 120 and processor 190 for extracting unwanted noise 115 above a certain threshold and providing it to an adaptive noise canceller 140 in accordance with the embodiment. Threshold detector 120 monitors the raw supply voltage line 105 for ripple/noise, and once the ripple/noise exceeds a predetermined threshold(s), processor 190 enables the adaptive noise canceller 140. In accordance with the embodiment, adaptive noise canceller 140 takes the noise signal 115 and generates a cancellation signal 145 having a same amplitude but opposite phase of noise signal 115. A power supply interface device 160, such as implemented with standard transistors, high power op amps or other interface devices, combines the raw direct A+ signal 105 with the cancellation signal 145 to provide a minimized error signal 165. The minimized error signal 165, which is also the output of the power supply conditioner 100, is provided to both the mobile radio circuitry 103 as well as being fed back through a second DC block 170, shown as a capacitor, to filter out error remaining on the output and providing this filtered error 175 back to the adaptive noise canceller 140.

Adaptive noise canceller 140 may be implemented in hardware or software. For illustrative purposes, the adaptive noise canceller 140 is shown as a separate block, however for certain applications, such as digital applications, the adaptive noise canceller may be configured within a digital signal processor. Functionally, adaptive noise canceller 140 updates filter coefficients 142 for use at adaptive filter 144. In accordance with the embodiment, the adaptive noise canceller 140 takes the error signal 175 along with current noise conditions to a coefficient update block 142 for use in adaptive filter 144. The updated coefficients are used as filter coefficients for adaptive filter 144 to adaptively filter incoming noise signal 115. The updated coefficients are used to produce an updated cancellation signal 145 for adaptively minimizing the noise on power supply line 105. The cancellation signal 145 is continuously updated based on current noise conditions. Thus, power supply conditioner 100 in accordance with the embodiment provides feed-forward rejection via the use of adaptive noise canceller 140 to minimize unwanted noise on power supply line 105. The continuous updating provides an adaptive system which is able to remove time-varying noise from the power supply line 105.

The embodiment of FIG. 1 is shown in a digital application and thus, the power supply conditioner 100 further includes analog to digital (A/D) converters 130 and 180, and a digital to analog (D/A) converter 150. The power supply conditioner 100 may just as easily operate in an all-analog environment without the use of the converters as will be discussed later in conjunction with FIG. 3. The adaptive noise canceller 140 and converters 130,150 and 180 are preferably deactivated when the ripple/noise falls below the predetermined threshold(s) to minimize power consumption in low noise environments, with power supply interface 160 simply providing the raw A+ signal directly to the mobile radio circuitry 103.

While the embodiment described in conjunction with of FIG. 1 uses a threshold detector 120 and processor 190 for noise detection, other devices such as a sensor could also be used. The processor 190 is preferred however, because the processor already exists as part of the mobile radio circuitry 103. The implementation of power supply conditioner 100 of the embodiment can be incorporated into a mobile radio design without significant cost and very few additional components by using the mobile radio's existing processor in conjunction with a noise cancellation technique providing adaptive filtering in a feed forward configuration.

Different adaptive filtering techniques can be used in the adaptive noise canceller 140 to reduce unwanted noise. For example, for ripple distortions, the power supply conditioning for sinusoidal noise may be obtained by using a Least Mean Squared (LMS) adaptive technique. In the LMS technique, the coefficients for the adaptive filter are updated based on the current noise conditions. The coefficients of the adaptive filter 144 are updated using the processor 190 to minimize the mean square value of the error signal. In other applications, a Recursive least squares (RLS) adaptive technique may be applied for other varying noise conditions. The adaptive noise canceller 140 operating in accordance with the present invention, whether embodied using LMS, RLS or some other technique, is applied in a feed-forward configuration to generate a cancellation signal 145 that is continuously updated.

Figure 2:
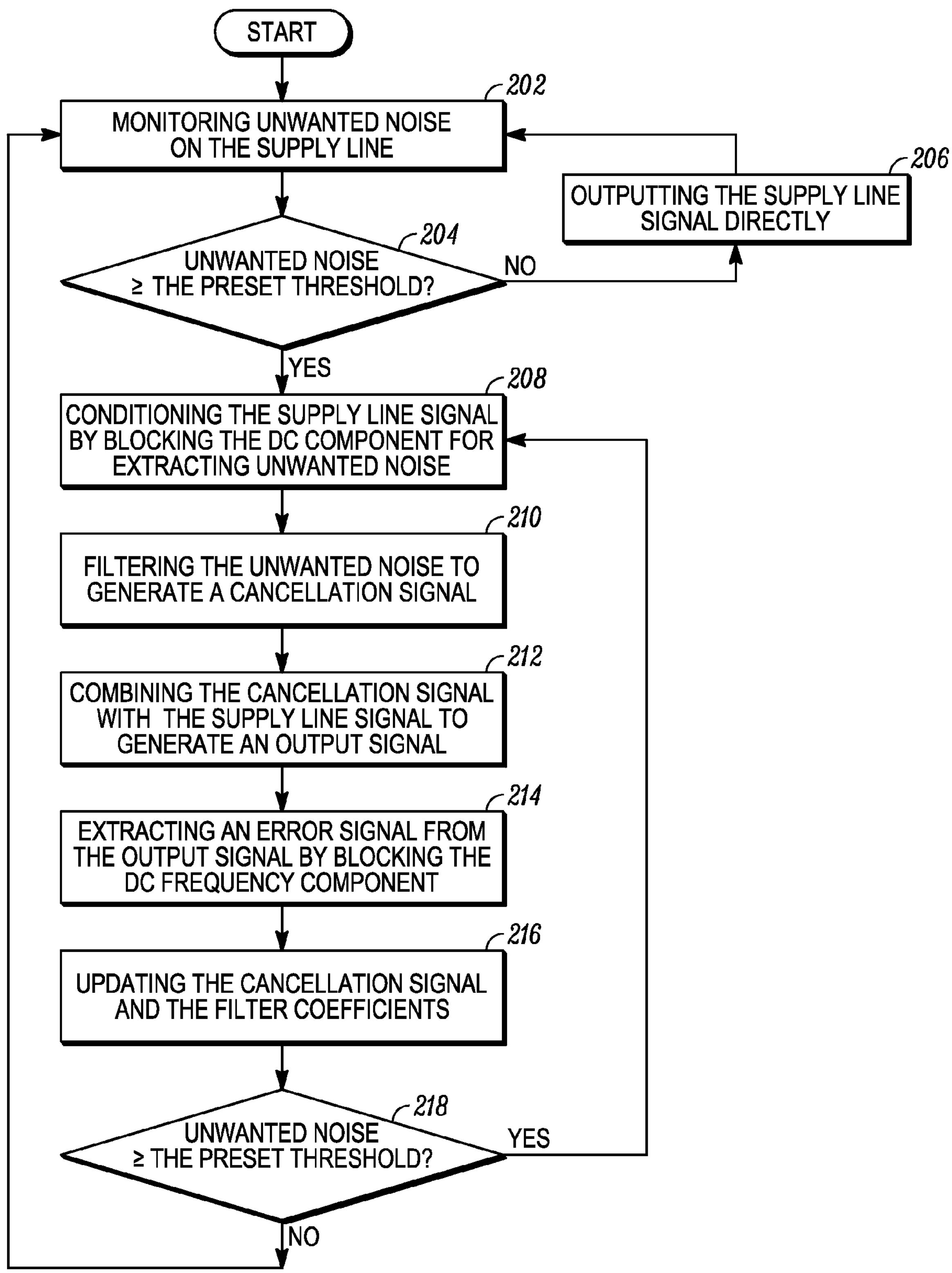
FIG. 2 is a flowchart of a method for minimizing noise on a supply line of a mobile radio in accordance an embodiment of the invention.

FIG. 2 is a flowchart of a method 200 for minimizing noise on a supply line of a mobile radio in accordance with an embodiment of the invention. Method 200 reduces the noise on the power supply line 105 while simultaneously reducing the power requirement for the power supply conditioner 100. At step 202, power supply conditioner 100 starts by monitoring the noise on the power supply line 105. In step 204, the power supply conditioner 100 determines if the noise exceeds a threshold value. If the noise falls below the threshold value, then a step of providing the supply line signal directly to the mobile radio electronics occurs at 206, followed by the return to step 202 for monitoring of the power supply line 105. Hence, steps 202, 204, and 206 of method 200 are repeated and the adaptive power conditioning is disabled for reducing the power requirement in low noise environment.

If the noise is above or equal to the threshold value, step 208 is initiated for conditioning the supply line signal. In step 208, the DC component of the supply line signal is blocked to extract the noise. Subsequently, the noise may be digitized for power supply conditioning implemented on digital systems. This is followed by step 210, wherein filtering of the noise is performed using adaptive filter 144 for generating a cancellation signal. Step 212 involves combining the cancellation signal with the supply line signal to generate an output signal. Additionally, in a digital system, the cancellation signal may be converted to an analog signal before being combined with the supply line signal. This is followed by extracting an error signal from the output signal by blocking the DC component in step 214. Finally, updating of the cancellation signal is performed in step 216 based on updated filter coefficients of the adaptive filter 144. The updating of filter coefficients is performed using the current noise conditions and the error signal. In the present embodiment, the steps 208 through 216 are repeated while the noise is above or equal to the threshold value. Repeating of steps results in an adaptive system which is able to remove time-varying noise from the power supply line 105. Whenever the noise falls below the threshold value, the power supply conditioner returns to step 202 and performs the steps of method 200 as required.

Figure 3:
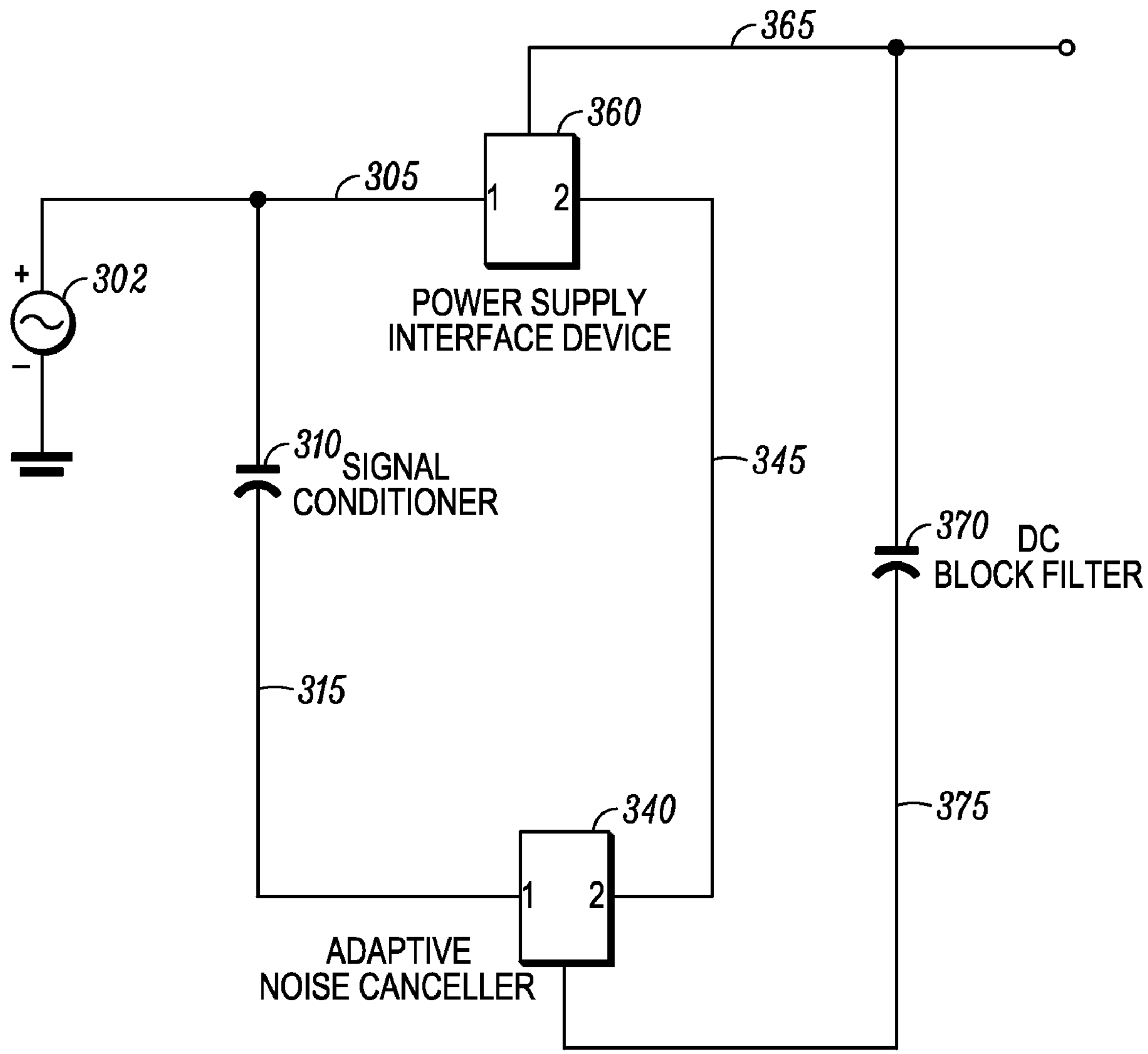
FIG. 3 is a schematic of a simplified power supply conditioner in accordance with some embodiments of the invention.
Figure 4:
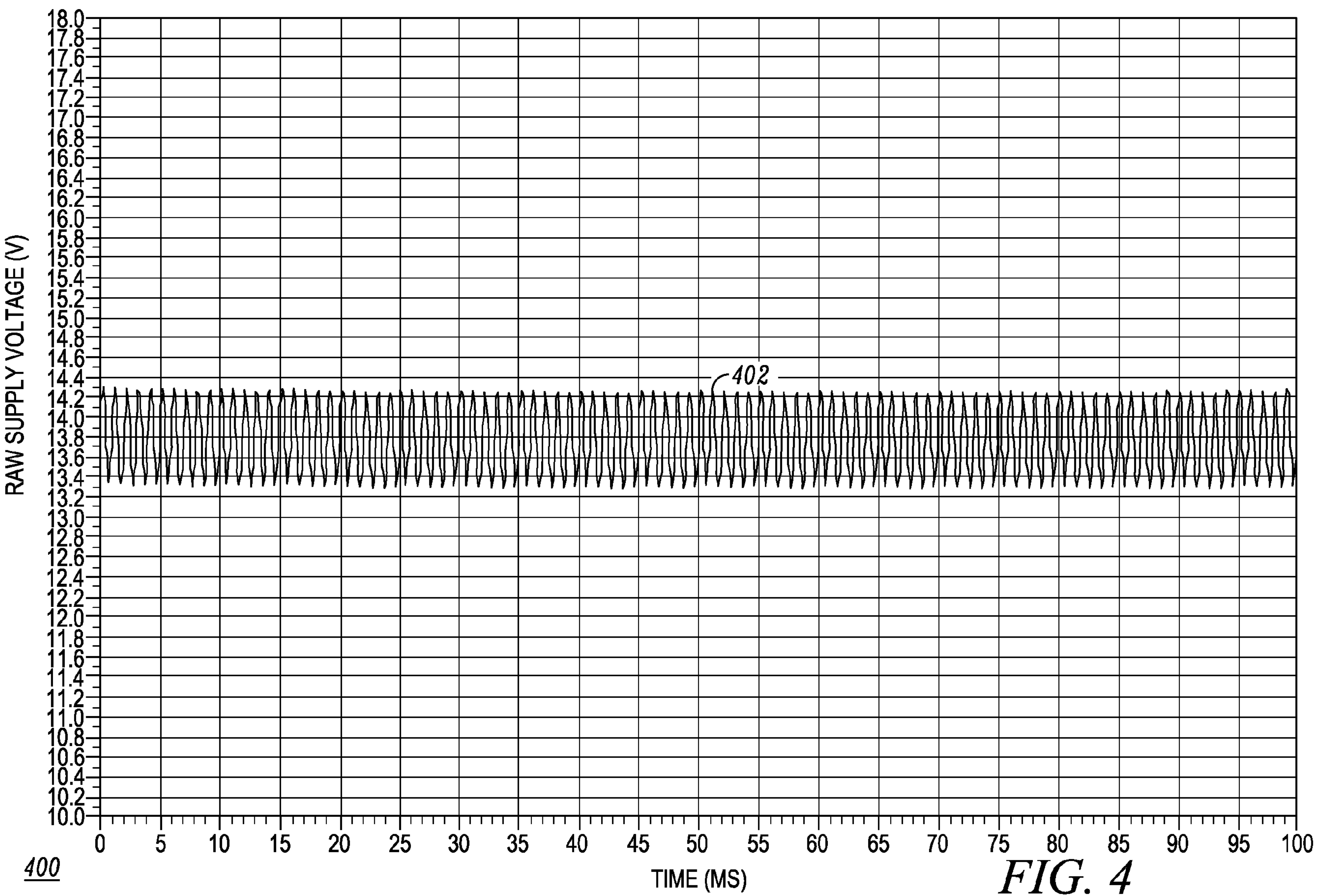
FIG. 4 is an example of a graph of power supply line input in accordance with some embodiments of the invention.
Figure 5:
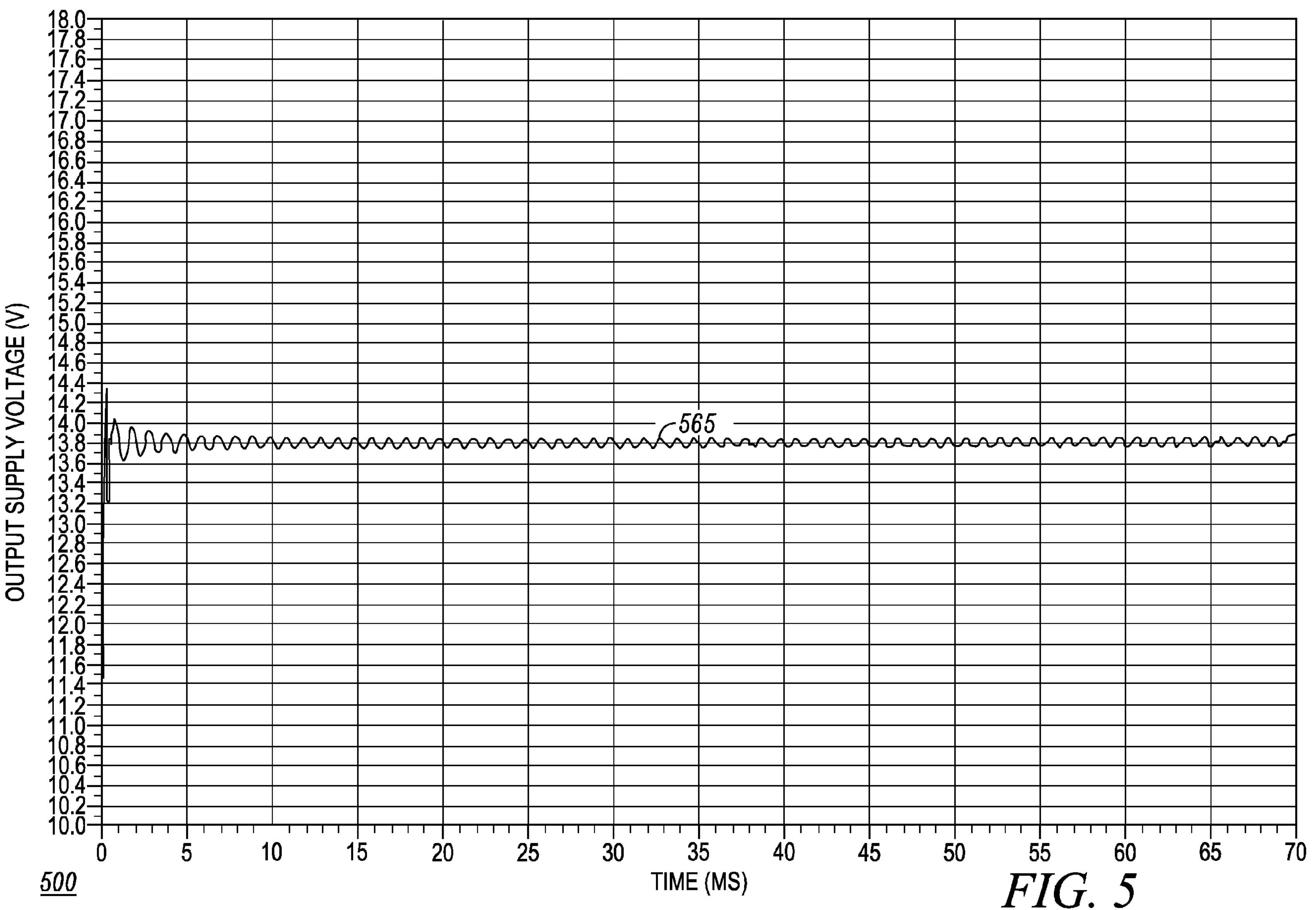
FIG. 5 is an example of a graph of simulated output for the power supply conditioner in accordance with some embodiments of the invention.

FIGS. 3, 4 and 5 are provided to show an example of an embodiment of the power supply conditioner under simulated conditions. FIG. 3 is a schematic of a simplified power supply conditioner 300 in accordance with a simulated analog embodiment of the invention. FIG. 4 provides a graph 400 of simulated input having noise generated thereon for use in the schematic simulation of FIG. 3. FIG. 5 shows a graph 500 of simulated output with minimum noise thereon as generated by the schematic simulation of FIG. 3. The schematic and graphs are provided as a visualization of improvement in noise minimization achievable with a power supply conditioner formed in accordance with this embodiment.

As FIG. 3 represents an analog embodiment, power supply conditioner 300 lacks the converters 130,150 and 180 of FIG. 1. The simplified power supply conditioner 300 was used for obtaining simulation results under varying noise conditions.

For simulation purposes, a DC blocking capacitor of 10 μF was used as a signal conditioner 310. The main power supply 302, A+ was set to 13.8V, and coupled to the power supply interface device 360. The output 365 from the power supply interface device 360 was coupled to DC block filter 370. In the simulation embodiment, the DC block 370 was implemented using a capacitor of 10 μF. Error signal 375 from the DC blocking capacitor 370 was fed back to the adaptive noise canceller 340 along with the DC blocked output from the first Dc blocking capacitor 310 to generate an updated cancellation signal 345. The cancellation signal 345 was combined with the noisy raw A+ to produce output 365 for the mobile radio 301.

FIG. 4 shows the power supply line input simulation for use at input 302 of FIG. 3. The graph 400 represents raw voltage supply along the y-axis and time along the x-axis. Besides 13.8V supply voltage, the raw A+ input 402 includes a 1 kilohertz, 1V peak-to-peak sinusoidal noise component. FIG. 5 shows the output signal 565 obtained at 301 of FIG. 3. Graph 500 represents output voltage supply along the y-axis and time along the x-axis. Graph 500 illustrates the simulated output 565 for the power supply conditioner 300 in response to the raw A+ input 402. It is observed that, as time passes, the output 565 rapidly converges towards the ideal Raw A+ voltage of 13.8V and sinusoidal noise component gets negligibly small. The simulated convergence time is less than 10 mS. The simulated reduction in the noise is found to be 20Log (0.064V/1.0V) or approximately 24 dB. Different mobile radio designs, noise levels, component values, threshold levels, etc. can all be optimized for different operating environments.

Figure 6:
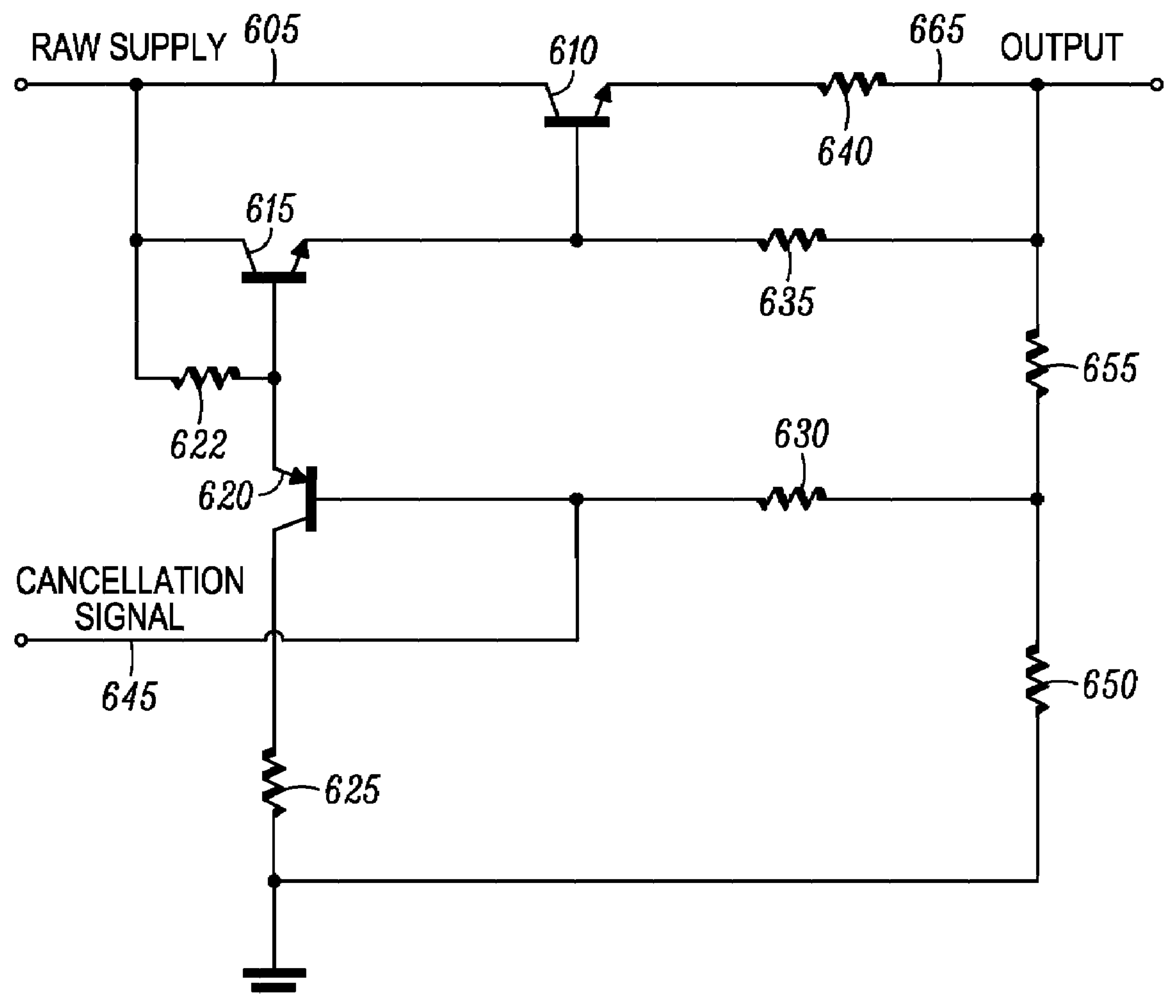
FIG. 6 is an example of a power interface device in accordance with some embodiments of the invention.

As mentioned previously, various implementations of the power supply interface device are possible in the described embodiments. The power interface device 160 of FIG. 1 may be an operational amplifier receiving the supply line input at one node and the cancellation signal at the other. FIG. 6 is an example of a power interface device in accordance with some embodiments of the invention. The power supply bus interface device 600 comprises a pass transistor 610, a driver transistor 615, a bias transistor 620, resistors 622, 625, 630, 635, 650, and 655, and a high power resistor 640. The pass transistor 610 has sufficient current gain to force the cancellation signal 645 (corresponding to 145 of FIG. 1) onto the supply line 605 (corresponding to supply line 105 of FIG. 1) for values up to the maximum expected amplitude of the unwanted noise component. It is also capable of handling the full rated supply current requirements of the supply line. The driver transistor 615 is used for driving the pass transistor 610. It has sufficient current gain to drive the pass transistor 610 in order to force the cancellation signal 645 onto the supply line. The bias transistor 620 acts as a switch to bias the driver transistor with the cancellation signal 145. It is also used to drive the pass transistor 610. Resistors 622, 625, 630, 635, 650, and 655 are used as biasing devices for the transistors 610, 615 and 620 for resulting in the required current gain. The high power resistor 640 is coupled to the output 675 (corresponding to 165 of FIG. 1) and is capable of handling large currents. As mentioned previously, other power supply interface device configurations can be used to combine the raw direct A+ signal with the cancellation signal to provide a minimized error signal.

Accordingly, there has been provided a power supply conditioner particularly useful for mobile radios mounted in a vehicle. The power supply conditioner of the present invention avoids the use of huge capacitors and inductors and thus achieves compact and robust design for a mobile radio's power supply. By utilizing the adaptive power supply conditioning scheme of the present invention, problems associated with time varying noise are avoided and fast noise cancellation on raw power supply is achieved. The power supply conditioner may be embodied on a digital signal processor for a digital implementation which may further simplify design. The use of a threshold detector in conjunction with the radio's processor significantly reduces the power consumption of the power supply conditioner for low noise environments.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

I claim:

1. A method for minimizing noise in a mobile radio of a vehicle, comprising the steps of:

generating a supply line signal from a power supply within the vehicle;

conditioning the supply line signal for the vehicle by extracting unwanted noise;

filtering the unwanted noise to generate a cancellation signal having same amplitude but opposite phase of the unwanted noise;

combining the cancellation signal with the supply line signal to generate an output signal;

extracting an error signal from the output signal; and updating the cancellation signal based on the error signal and current noise conditions while supplying the output signal to an input of the mobile radio.

2. The method of claim 1, further comprising repeating the steps of conditioning through updating while the unwanted noise is above a threshold value.

3. The method of claim 1, further comprises outputting the supply line signal directly to the input of the mobile radio, if the unwanted noise falls below a threshold value.

4. The method of claim 3, further comprises:

monitoring the unwanted noise on the supply line signal; and repeating the steps of conditioning through updating if the unwanted noise is above the threshold value.

5. The method of claim 1, wherein the step of conditioning further comprises blocking a DC frequency component in the supply line signal to extract the unwanted noise.

6. The method of claim 1, further comprising a step of digitizing the unwanted noise after the step of conditioning.

7. The method of claim 6, further comprising a step of converting the cancellation signal from a digital signal to an analog signal prior to the step of combining.

8. The method of claim 7, further comprising a step of digitizing the error signal after the step of extracting.

9. The method of claim 1, wherein the step of extracting the error signal further comprises blocking a DC frequency component of the output signal.

10. The method of claim 1, wherein the step of updating further comprises determining coefficients of an adaptive filter so that a mean square of the error signal is minimized.

11. An apparatus for minimizing noise in a mobile radio of a vehicle, comprising:

a signal conditioner receiving an input from a supply line generated from an output of a power supply for the vehicle, the signal conditioner for extracting unwanted noise;

an adaptive noise canceller receiving the unwanted noise and generating a cancellation signal;

a power supply interface device combining the cancellation signal to the supply line for producing an output signal; and a feedback path extracting an error signal from the output signal and providing the error signal to the adaptive noise canceller.

12. The apparatus of claim 11 further comprising:

a threshold detector for detecting when the unwanted noise exceeds a threshold value; and a processor for enabling the apparatus in response to the detector detecting that unwanted noise exceeds a threshold value.

13. The apparatus of claim 11, wherein the signal conditioner comprises a first capacitor for filtering unwanted noise from the input.

14. The apparatus of claim 13, further comprising an analog to digital converter for digitizing of the unwanted noise.

15. The apparatus of claim 14, further comprising a digital to analog converter for converting the cancellation signal to an analog signal for the power supply interface device.

16. The apparatus of claim 14, wherein the feedback path farther comprises an analog to digital converter for converting the error signal to a digital signal for the adaptive noise canceller.

17. The apparatus of claim 11, wherein the adaptive noise canceller comprises an adaptive filter and a processing means used to minimize mean square of the error signal.

18. The apparatus of claim 11, wherein the power supply interface device comprises:

a pass transistor coupled along the supply line to force the cancellation signal on to the supply line;

a driver transistor coupled to a control gate of the pass transistor for enabling the pass transistor;

a bias transistor for receiving the cancellation signal and biasing the driver transistor with the cancellation signal;

a plurality of bias resistors coupled to the driver transistor, the bias resistors and the bias transistor for generating sufficient current for driving the cancellation signal onto the output; and a high power resistor for coupling output of the pass transistor as the output.

19. The apparatus of claim 11, wherein the power supply interface device includes an operational amplifier.

20. The apparatus of claim 11, wherein the feedback path includes a second capacitor for filtering error from the output signal and presenting the error signal to the adaptive noise canceller.

21. A vehicle, comprising:

a mobile radio mounted within the vehicle;

a plurality of electromechanical components;

a main DC power supply powering the plurality of eletromechanical components and the mobile radio, the main power supply having a power supply line with unwanted noise generated thereon by the plurality of electromechanical components;

an adaptive power supply conditioner within the mobile radio, the adaptive power supply conditioner detecting unwanted noise on the power supply line and generating an inverse cancellation signal in response thereto, the adaptive power supply conditioner combining the inverse cancellation signal with the unwanted noise on the power supply line powering the mobile radio; and wherein the inverse cancellation signal combined with the unwanted noise provides an output signal, the output signal having error extracted therefrom, the error being fed back to the adaptive noise canceller, and wherein the inverse cancellation signal is continuously updated based on current noise conditions and the error extracted from the output signal.

* * * * *